(12) United States Patent
Burton

(10) Patent No.: US 9,475,421 B2
(45) Date of Patent: Oct. 25, 2016

(54) REFLECTOR DAMPER BRACKET

(71) Applicant: Burton Technologies, LLC, Ludington, MI (US)

(72) Inventor: John Edwards Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

(21) Appl. No.: 14/519,830

(22) Filed: Oct. 21, 2014

(65) Prior Publication Data

US 2015/0109809 A1  Apr. 23, 2015

Related U.S. Application Data

(60) Provisional application No. 61/894,676, filed on Oct. 23, 2013.

(51) Int. Cl.
| | |
|---|---|
| *F21S 8/10* | (2006.01) |
| *F21V 7/00* | (2006.01) |
| *F21V 14/02* | (2006.01) |
| *B60Q 1/04* | (2006.01) |
| *B60Q 1/068* | (2006.01) |

(52) U.S. Cl.
CPC ............ *B60Q 1/0483* (2013.01); *B60Q 1/068* (2013.01); *F21S 48/1305* (2013.01); *B60Q 2200/32* (2013.01); *B60Q 2200/36* (2013.01)

(58) Field of Classification Search
CPC  B60Q 1/0483; B60Q 1/068; B60Q 2200/36; B60Q 2200/32; F21S 48/1305
See application file for complete search history.

(56) References Cited

U.S. PATENT DOCUMENTS

| | | | |
|---|---|---|---|
| 3,722,920 A | 3/1973 | Reese | |
| 4,884,174 A | 11/1989 | Dorleans | |
| 5,104,098 A | 4/1992 | Kaneko | |
| 5,322,252 A * | 6/1994 | Puente ............... | B60Q 1/0683 248/222.12 |
| 5,333,845 A | 8/1994 | Seiichi | |
| 5,697,477 A | 12/1997 | Hiramoto | |
| 5,884,734 A | 3/1999 | Hiramoto | |
| 6,062,352 A | 5/2000 | Shinozaki | |
| 6,189,662 B1 | 2/2001 | Bivens | |
| 6,199,673 B1 | 3/2001 | Wach | |
| 6,220,583 B1 | 4/2001 | Ito | |
| 6,269,919 B1 | 8/2001 | Bivens | |

(Continued)

FOREIGN PATENT DOCUMENTS

| | | |
|---|---|---|
| DE | 102011017538 | 10/2012 |
| GB | 2116684 | 9/1983 |

(Continued)

OTHER PUBLICATIONS

European Patent Office Search Report for Application No. 14190115.7 mailed Mar. 11, 2015.

*Primary Examiner* — Donald Raleigh
(74) *Attorney, Agent, or Firm* — Godfrey & Kahn, S.C.; Brian G. Gilpin; James A. Joyce

(57) ABSTRACT

A headlamp assembly typically includes a high beam reflector and a low beam reflector. A linkage synchronizes the aim of a high beam reflector with a low beam reflector while also providing damping for both reflectors to stop them from visibly shaking or fluttering the light beam under vibration in actual use. The damping linkage could also be employed in a single reflector environment.

10 Claims, 7 Drawing Sheets

(56) References Cited

U.S. PATENT DOCUMENTS

| | | |
|---|---|---|
| 6,367,785 B1 | 4/2002 | Nakabayashi |
| 6,442,796 B2 | 9/2002 | Arisaka |
| 6,460,839 B2 | 10/2002 | Muller |
| 6,513,811 B1 | 2/2003 | Bivens |
| 6,678,918 B2 | 1/2004 | Nakabayashi |
| 6,726,219 B2 | 4/2004 | Bivens |
| 7,367,086 B2 | 5/2008 | Ito |
| 8,453,810 B2 | 6/2013 | Okabayashi |
| 2002/0085385 A1 | 7/2002 | Shirai |
| 2005/0262954 A1* | 12/2005 | Eto et al. ............ 74/89.36 |

FOREIGN PATENT DOCUMENTS

| | | |
|---|---|---|
| JP | H0536301 | 2/1993 |
| JP | 2001351407 | 12/2001 |
| KR | 20120134856 | 12/2012 |

* cited by examiner

REFLECTOR DAMPER BRACKET

PRIORITY CLAIM/CROSS-REFERENCE TO RELATED APPLICATIONS

This application claims priority from U.S. Provisional Patent Application No. 61/894,676, filed Oct. 23, 2013, which is incorporated herein by reference for all purposes.

FIELD OF THE INVENTION

The present invention relates to the field of motor vehicle headlamps with internal reflectors contained within a headlamp housing and lens, and mechanisms for damping fluttering of the reflectors. The present invention also relates to a linkage that synchronizes the aim of a high beam reflector with a low beam reflector while also providing damping for both reflectors to stop them from visibly shaking or fluttering the light beam under vibration in actual use.

BACKGROUND

Vehicle headlamps designed with two independent reflectors, typically one used for the low beam and one used for the high beam, are also typically aim adjusted from a single adjustment location outside the headlamp. A linkage bracket can be used inside the headlamp to connect the low and high beam reflectors and synchronize aim. However, preventing reflector flutter under vibration can be difficult in this situation, due in part to the mass of each reflector independently being suspended about separate pivot points, in addition to other reflector design variables.

As such, there is a need for a linkage bracket to connect and synchronize independently pivoting reflectors for aiming, while also providing damping to prevent beam flutter for one or both reflectors during vibration in actual use. There is also a need for an improved mechanism for providing damping to prevent beam flutter in individual reflectors during vibration in actual use.

SUMMARY

Disclosed is a reflector damper bracket comprising a link damper, and a link bracket in frictional sliding engagement with the link damper. The link bracket includes at least one ball adapted for attachment to at least one reflector, and the link damper includes a post adapted for attachment to a headlamp housing.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
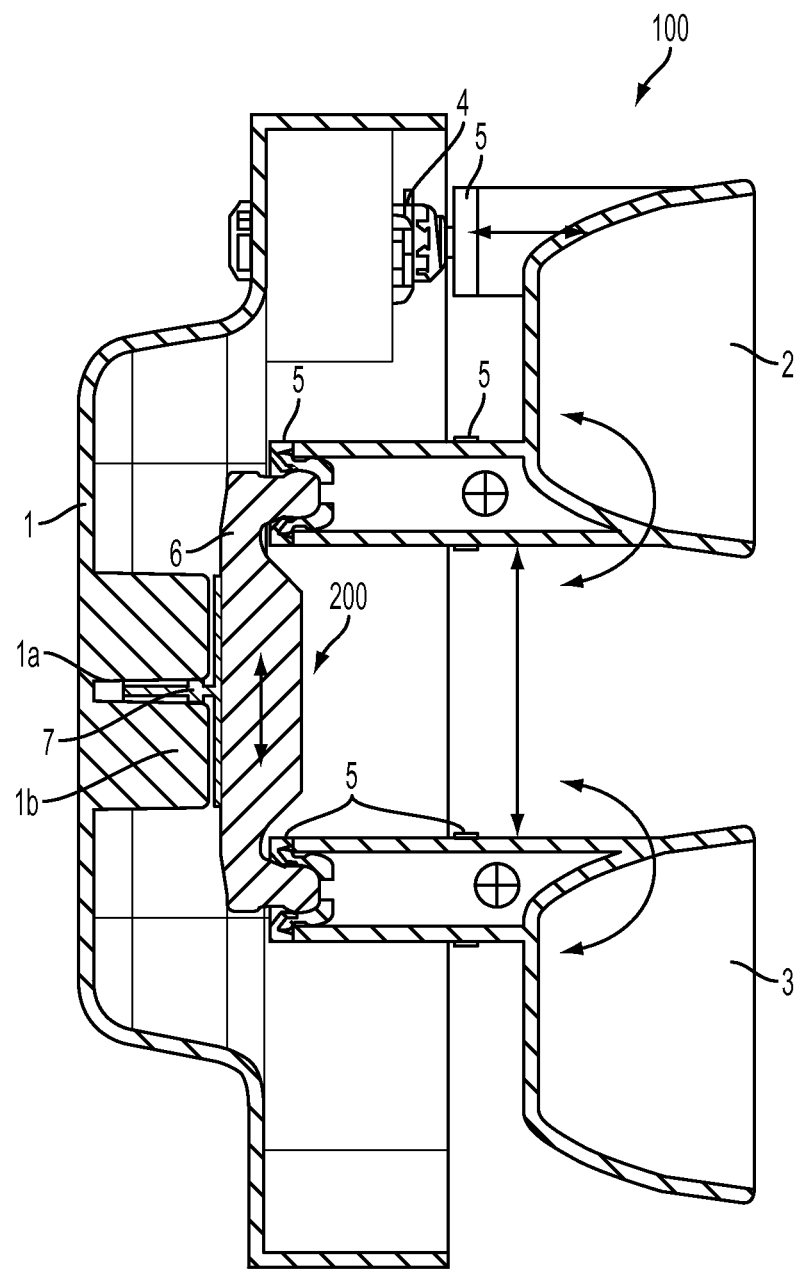
FIG. 1 is a side view cross section of a headlamp that includes one embodiment of a reflector damper bracket in accordance with the invention.
Figure 2:
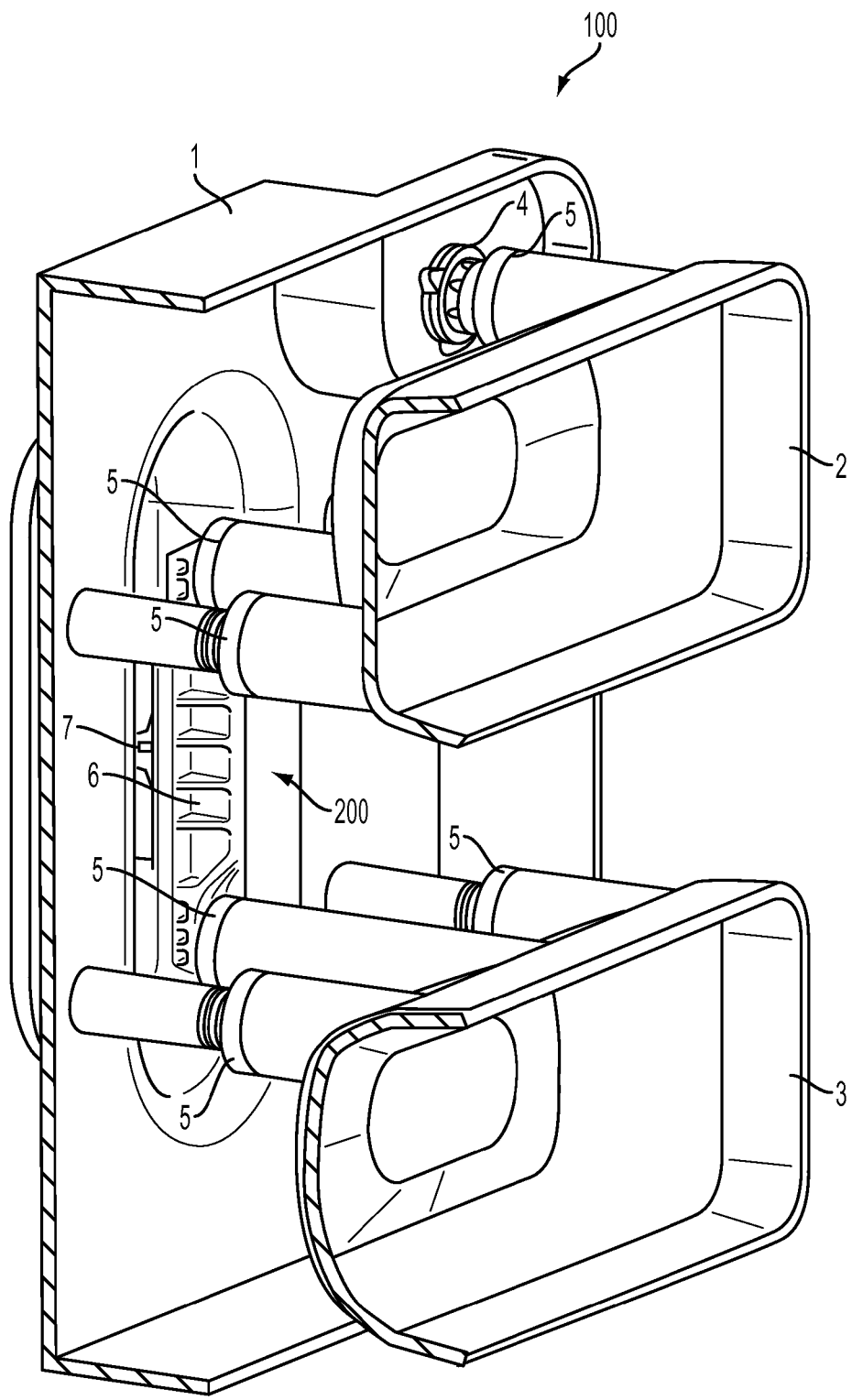
FIG. 2 is a perspective view cross section of a headlamp that includes the reflector damper bracket of FIG. 1.

The embodiment of a reflector damper bracket 200 shown in FIG. 1 and FIG. 2 consists of a link bracket 6 and a link damper 7 located inside a headlamp assembly 100. The link bracket 6 is connected to an upper reflector 2 and a lower reflector 3 using ball sockets 5 located at each end of the link bracket 6. The upper reflector 2 and lower reflector 3 also have additional ball sockets 5 for fixed pivots arranged in a manner such that when the adjuster 4 moves right or left, as shown in FIG. 1, the link bracket 6 moves up and down, synchronizing the rotation of upper reflector 2 and lower reflector 3 about their respective fixed pivots.

The link bracket 6 has an up and down sliding fit with the link damper 7 which is attached to the headlamp housing 1 using a post 12 that is inserted into a boss hole 1a inside a headlamp housing boss 1b.

Figure 3:
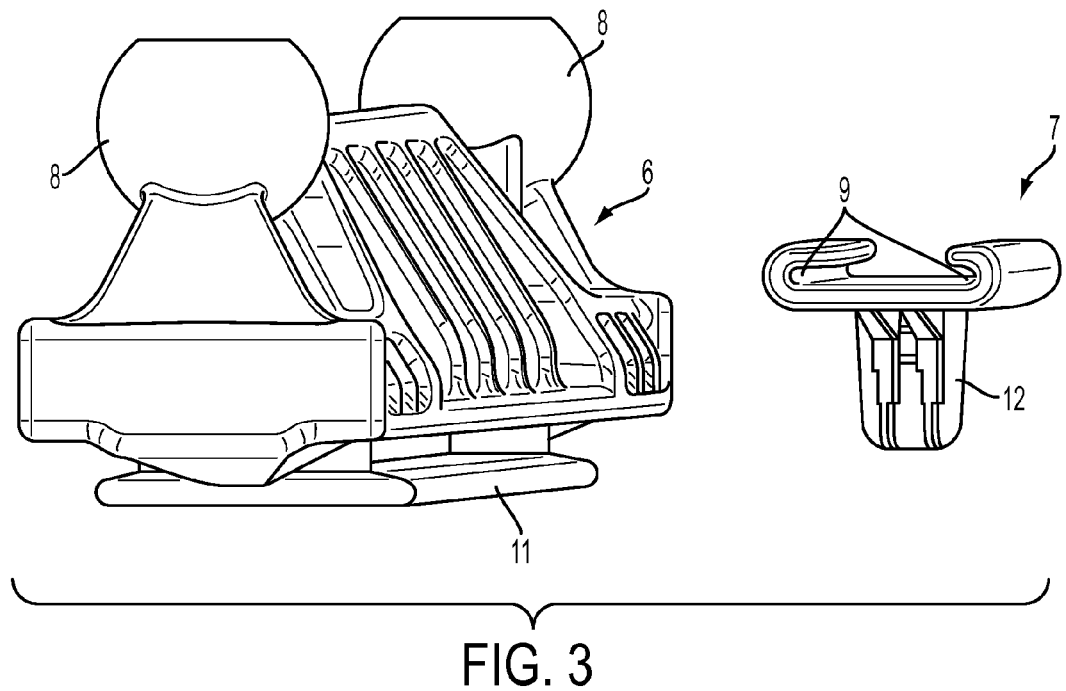
FIG. 3 and FIG. 4 are exploded perspectives view of the reflector damper bracket of FIG. 1.
Figure 4:
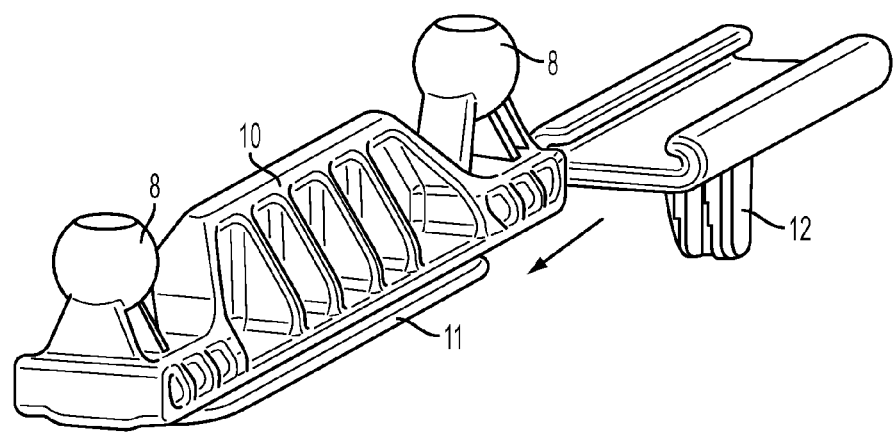

FIG. 3 and FIG. 4 show the separate parts of the link damper bracket 200 before they are put together. The link bracket 6 includes spaced apart ball pivots 8 at each end, a body 10 and a plate 11. The link damper 7 includes the post 12 extending from a channel or C-shaped guide 15, and a slot 9. The slot 9 of the link bracket 7 receives the plate 11 of the link bracket 6 when the two parts are assembled in the direction of the arrow as shown in FIG. 4, and creates a tight sliding friction fit. Once assembled, the link damper 7 remains attached to the link bracket 6 in the desired position, due to the friction fit.

Figure 5A:
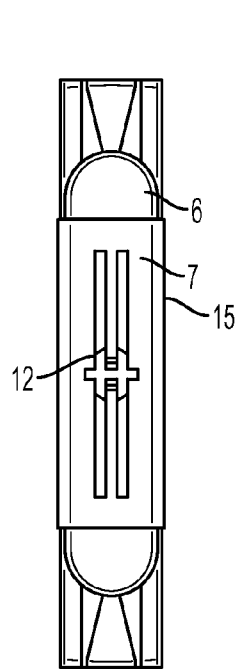
FIG. 5A is a bottom view of the reflector damper bracket of FIG. 1.
Figure 5B:
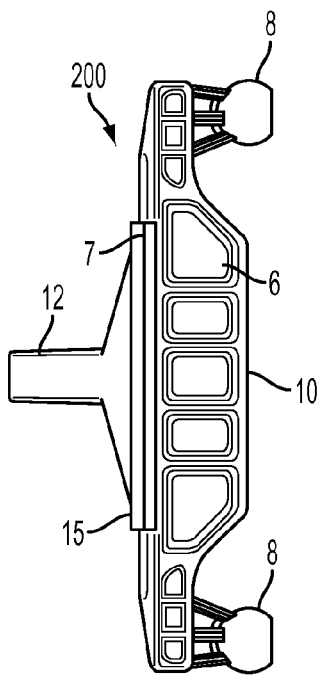
FIG. 5B is a side view of the reflector damper bracket of FIG. 1.
Figure 5C:
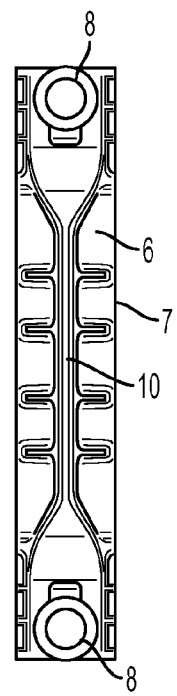
FIG. 5C is a top view of the reflector damper bracket of FIG. 1.

FIGS. 5A, 5B and 5C show several views of the link damper bracket 200 with the link bracket 6 and link damper 7 assembled together and ready for assembly to the headlamp 100. Both parts may be molded from any number of plastics suitable for the headlamp such as, but not limited to, Polycarbonate, PP or Nylon.

Figure 6A:
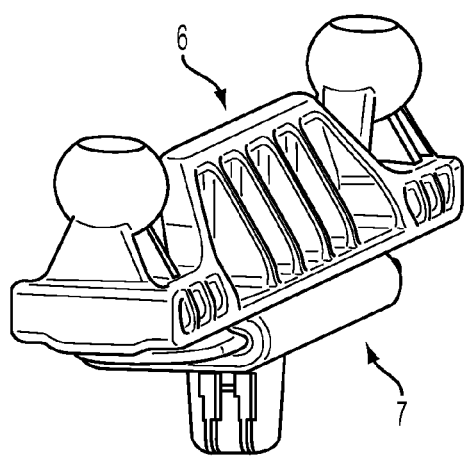
FIG. 6A is a perspective view and FIG. 6B is a cross section of the reflector damper bracket of FIG. 1.
Figure 6B:
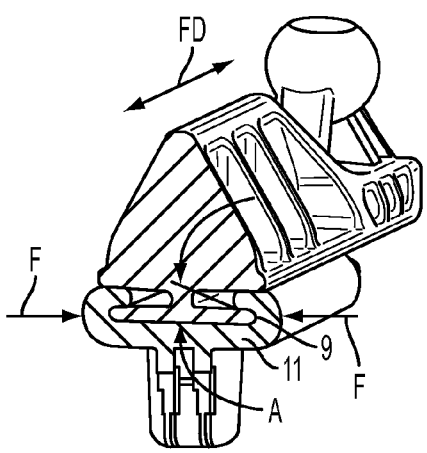
Figure 7:
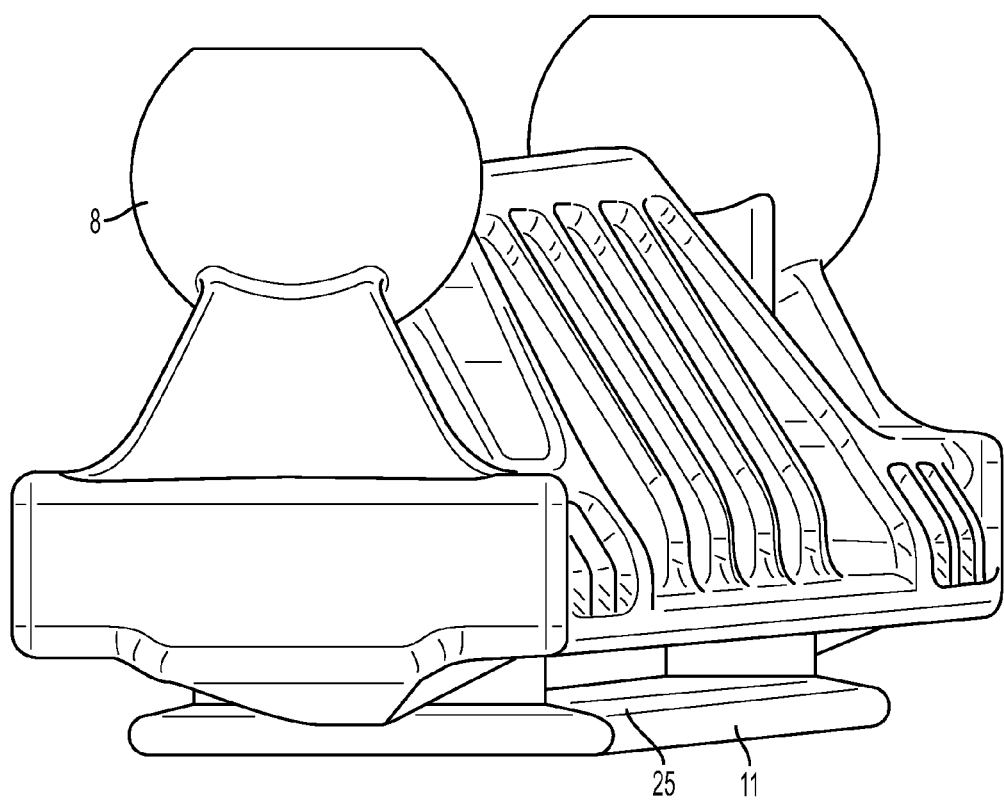
FIG. 7 is an enlarged perspective view of the reflector damper bracket of FIG. 1.

FIGS. 6A and 6B show the detail of the sliding friction fit between the link bracket plate 11 and the link damper slot 9. The inside of the slot 9 can be tapered to a desired angle A to aid in creating a friction fit. The slot 9 and plate 11 can be nearly any shape or angle to suit the application, or can be reversed so that the slot 9 is formed in the link bracket 6 and the plate 11 is formed in the link damper 7, without departing from the invention. To prevent unwanted beam flutter during vibration, a minimum friction force in the direction of arrows FD is needed. To allow adjustment function and prevent undue stress on components, a maximum friction force FD is also needed. The interference fit between the plate 11 and slot 9 creates a clamp force F. Angle A (see FIG. 6B) of plate edge 25 (see FIG. 7) between the plate 11 and slot 9 creates a wedge fit which helps to achieve a desired friction force FD, without the need for excessive interference between parts and related material stress. Therefore a desired friction force FD can be achieved at relatively low clamp forces F.

Figure 8:
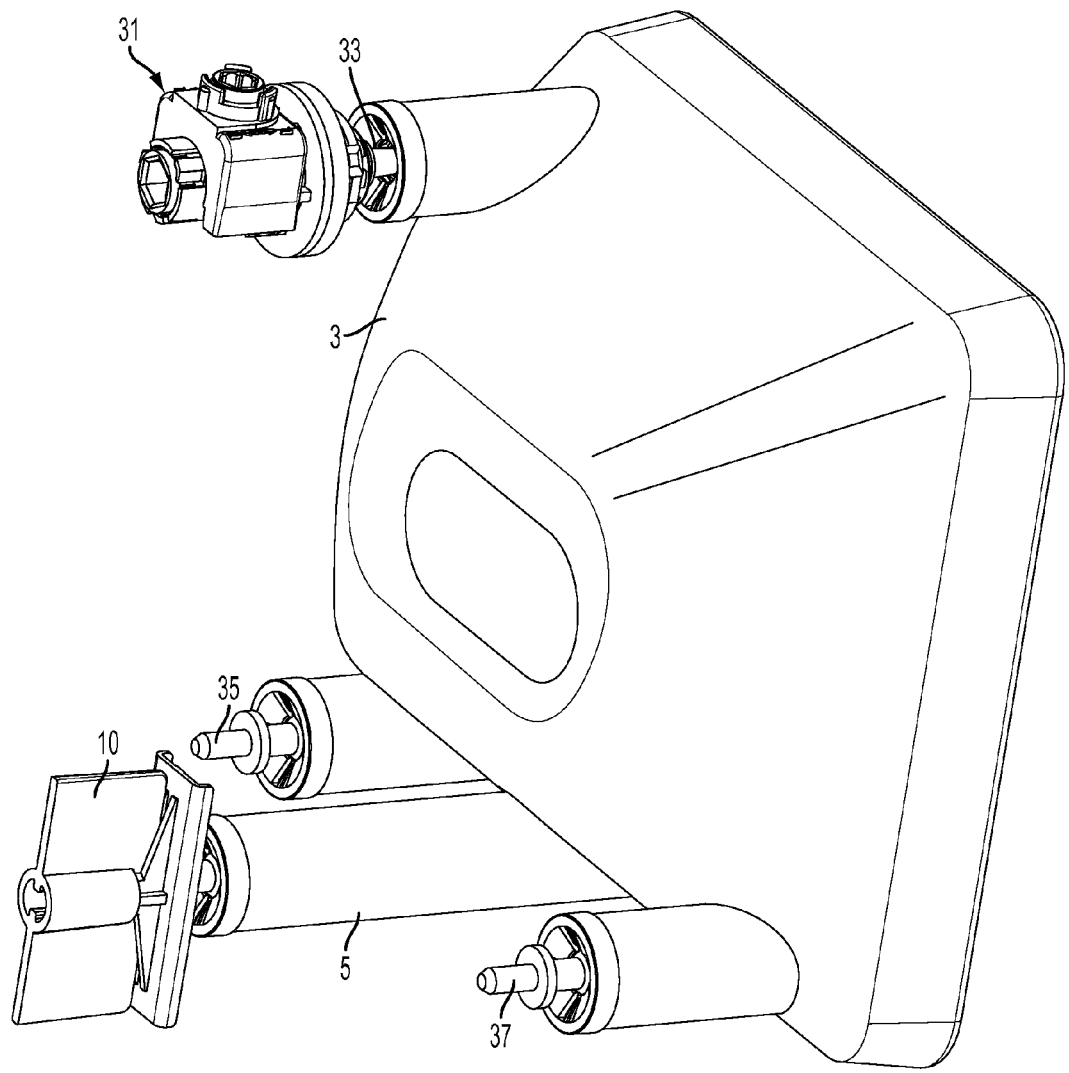
FIG. 8 is a partial perspective view of the rear of a reflector with another embodiment of a reflector damper bracket in accordance with the invention.

As illustrated in FIG. 8, one reflector is shown mounted by four connections. One is a reflector adjuster 31 shown in the upper left corner of FIG. 8. The adjuster 31, when its top mounted gear is turned, results in reverse or forward movement of a plunger 33 pivotally connected to the reflector 3. This in turn results in the back or forth movement of the top of the reflector 3. The reflector 3 is also mounted at two fixed pivot points 35 and 37, at the left lower corner and right lower corner of the reflector 3. Thus, the back and forth movement of the top of the reflector 3 by the adjuster 31 results in the tilting up or down of the reflector 3.

Figure 9:
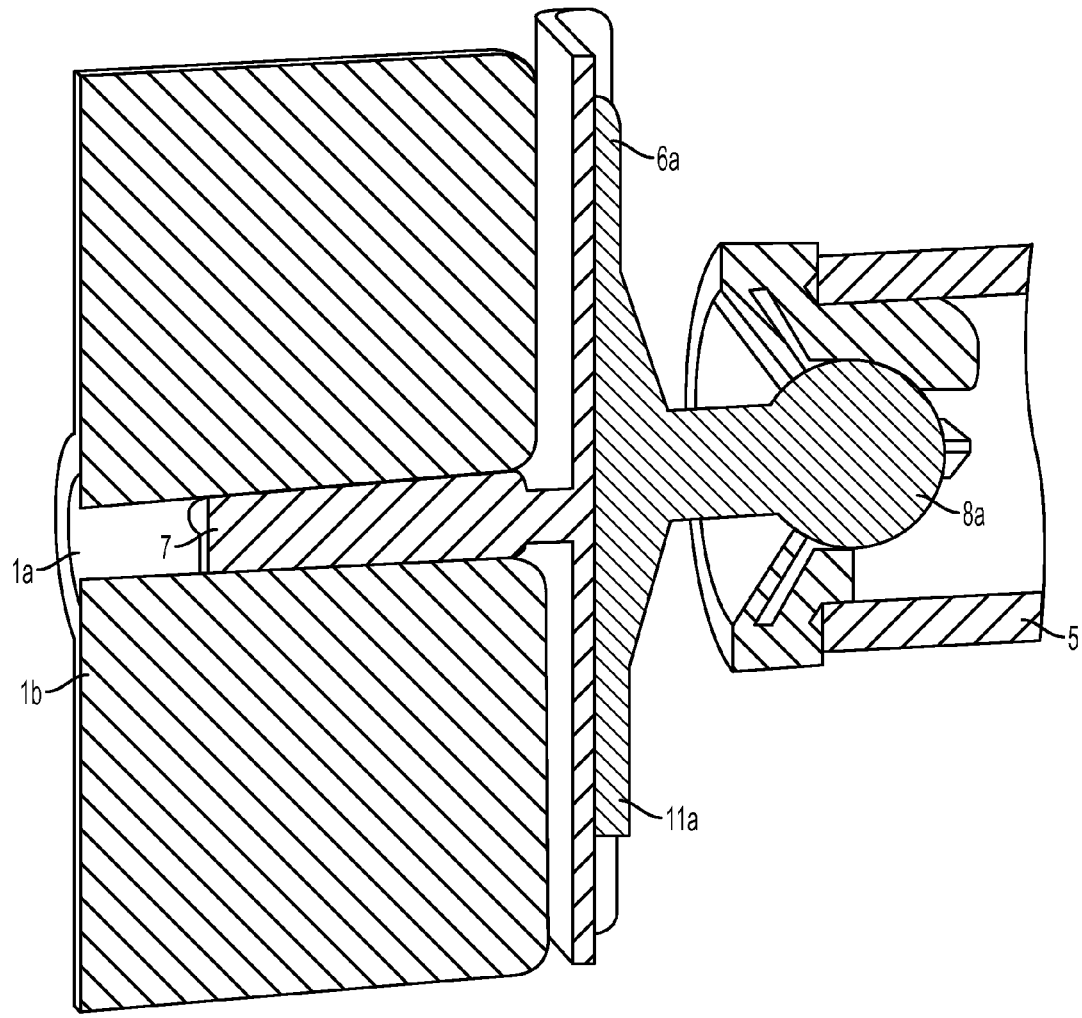
FIG. 9 is a partial cross sectional view through the housing boss, link damper, link bracket, and ball socket shown in FIG. 8.

Because of the mass of the reflector 3, as described above, jolting or vibrating of a vehicle in which the reflector 3 is mounted can result in the fluttering of the reflector 3 and its included light beam. In order to limit this fluttering, the reflector 3 is also connected to a link damper 7 according to this disclosure. More particularly, an embodiment of a link bracket 6a is shown in FIG. 9. The link bracket 6a is identical to the link bracket 6, except now it has a single ball pivot 8a. As described above, the link damper 7 includes a slot 9. The slot 9 of the link bracket 7 receives a plate 11a of the link bracket 6a when the two parts are assembled in the direction of the arrow as shown in FIG. 4, and creates a sliding friction fit. Once assembled, the link damper 7 remains attached to the link bracket 6a in the desired position, due to the friction fit.

As a result of the mounting of the link bracket 6a in the link damper 7, movement of the reflector 3 and the link bracket 6a in a vertical direction, as shown in FIGS. 8 and 9, is dampened by the link damper 7. In other embodiments (not shown), where other pivot mountings of the reflector may be used, the link bracket 6a and link damper 7 can be rotated ninety degrees relative to the housing boss 1b so that the reflector 3 can also be dampened when there is movement in a horizontal direction. In still other embodiments (not shown), more than one link damper and one link bracket can be used with each reflector in order to provide damping in both a vertical and horizontal direction, if desired.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A reflector damper bracket comprising:
   a link damper, adapted for attachment to a headlamp housing via a post extending therefrom; and
   a link bracket in frictional sliding engagement with the link damper, the link bracket including at least one ball adapted for attachment to at least one reflector, wherein one of the link bracket and the link damper includes a plate and the other includes a C-shaped portion for receiving the plate at least partially therein.

2. A reflector damper bracket in accordance with claim 1 wherein the link bracket includes a plate and the link damper includes a C-shaped portion for receiving the plate at least partially therein.

3. A reflector damper bracket in accordance with claim 1 wherein the plate has spaced apart parallel edges.

4. A reflector damper bracket in accordance with claim 3 wherein each of the spaced apart parallel edges has a wedge shape for frictional sliding engagement with the C-shaped portion.

5. A reflector damper bracket comprising:
   a link damper, adapted for attachment to a headlamp housing via a post extending therefrom; and
   a link bracket in frictional sliding engagement with the link damper, the link bracket including at least one ball adapted for attachment to at least one reflector, wherein the link bracket includes a body having at least two spaced apart balls extending therefrom, each of which is adapted for attachment to at least one reflector.

6. A reflector damper bracket comprising:
   a link damper, and
   a link bracket in frictional sliding engagement with the link damper, the link bracket including a body, having a plate with two spaced apart parallel wedge shaped edges, and at least two spaced apart balls attached to the body, each ball being adapted for attachment to at least one reflector, the link damper including a post adapted for attachment to a headlamp housing, and the link damper including a C-shaped portion in frictional sliding engagement with the plate.

7. A reflector damper bracket comprising:
   a link damper, adapted for attachment to a headlamp housing via a post extending therefrom;
   a link bracket in frictional sliding engagement with the link damper, the link bracket including at least one ball adapted for attachment to at least one reflector; and
   a first ball and a second ball, each extending from a body of the link bracket, wherein the first ball is adapted for attachment to a first reflector, and the second ball is adapted for attachment to a second reflector.

8. A reflector damper bracket comprising:
   a link damper, and
   a link bracket in frictional sliding engagement with the link damper, the link bracket including at least one ball adapted for attachment to at least one reflector, the link damper including a post adapted for attachment to a headlamp housing, wherein the link bracket includes a plate and the link damper includes a C-shaped portion for receiving the plate at least partially therein.

9. A reflector damper bracket in accordance with claim 8 wherein the plate has spaced apart parallel edges, each edge having a wedge shape for frictional sliding engagement with the C-shaped portion.

10. A reflector damper bracket in accordance with claim 8 wherein the at least one ball includes a first ball and a second ball, each extending from a body of the link bracket, and wherein the at least one reflector includes a first reflector and a second reflector, wherein the first ball is adapted for attachment to the first reflector, and the second ball is adapted for attachment to the second reflector.

* * * * *